Patented Apr. 22, 1941

2,238,906

UNITED STATES PATENT OFFICE 2,238,906

ALGINATE COMPOUND AND METHOD OF DISPERSING SAME IN MILK PRODUCTS

Jean Kingsley Martell, Wynnewood, Pa., and Joseph W. Schaller, San Diego, Calif., assignors to Fitger California Company, Los Angeles, Calif., a corporation of California No Drawing. Application August 31, 1938, Serial No. 227,863. Renewed July 17, 1940

18 Claims. (Cl. 99—136)

Our invention includes a new alginate compound and method of dispersing same in milk products.

Heretofore alginates have been objected to by some dairies because they could not be readily dissolved in milk during pasteurization. The milk pasteurizing vats ordinarily employed in dairies agitate the products very mildly, and when dry granular alginate compounds (such as described in the hereinafter mentioned patents) are added, particles of the alginates settle to the bottom of the vat and lump together. These lumps will not dissolve during the pasteurization and after the vats are drained these lumps have to be cleaned out of the pasteurizer. Furthermore, such incomplete solution of the alginates result in only partial stabilization of ice cream mixes or other milk products mixed with such alginates, and as the degree of solution obtained was variable, the resulting products were not uniform. The alginate lumps also caused trouble by clogging the screens in the dairy pipe lines, thereby causing delays, loss of production and expense.

Many attempts have been made to overcome these troubles; f. i., (1) alginate products of finer particle size were tried, but these tended to float on the surface, then lump and stick to the sides of the pasteurizer. (2) Greater agitation in the pasteurizer was also tried, and while this produced better solution of the alginate it was not uniform in products, and many dairies cannot increase the speed of agitation in their pasteurizers without expensive changes. (3) It was also attempted to dissolve the alginate by vigorously stirring it in hot water and adding this solution to the mix in the pasteurizer. This method would produce complete solution of the alginate with slow agitation, but in order to have the solution thin enough to pour into the pasteurizer and thoroughly disperse in the milk, about forty times as much water as alginate was required; and although this method has sometimes been used by dairies in making chocolate milk, it is not feasible for ice cream manufacture as the large amount of water required had to be compensated for by adding more milk serum solids in the form of condensed or powdered milk to the mix, which involved additional expense and inconvenience; and the mechanical handling of this large amount of water was troublesome, and frequently impractical, and required special equipment.

We have discovered that the addition of a small percent of borax to an alginate compound (such as disclosed in U. S. Patents #2,097,224, #2,097,225, #2,097,228, #2,097,229 and #2,097,231) renders the compound readily dispersible in a small amount of water; and by adding such solution of the borated alginate compound to milk products during pasteurization thereof complete solution of the alginate is obtained.

We discovered that the addition of a small percent of borax to the alginate compound decreases the solubility rate of the alginate in water; and that complete dispersion or wetting of all alginate particles in water could be obtained without dissolving more than a small percentage of the alginate. By such addition we were able to disperse the alginate in less than four times its weight in water. And in an ice cream mix containing ¼% alginate, only 1% of water need be added; whereas, over 10% of water had to be added when an alginate compound not containing borax was used. When borax was used the amount of water was negligible; but when alginate compounds without borax were used the large amount of water required had to be compensated for as described above.

In another comparative test, the same method was tried using alginates containing no borax, and the alginate dissolved so fast that thirty times as much water as alginate was required. About half of the alginate was in solution during the half minute required to disperse the alginate. This was nearly as bad a condition as when the alginate was completely dissolved in water, and was impractical for the same reasons.

The borated alginate is readily dispersed in a small amount of water while the unborated product tends to dissolve and forms a solution of such high viscosity that it is difficult to handle and will form lumps which inhibit solubility when added to the milk. The ability to dissolve in the water is not desired. The ability to readily disperse in a relatively small amount of water without appreciable solution is the desirable property imparted by the borax. If the alginate is immediately soluble in the water, an inordinately large quantity of water is required to dilute the solution to a point where the viscosity is low enough for practical handling, i. e., pouring into the pasteurizer with resultant thorough dispersion in the milk. If the particles tend to coalesce and lump together, this inhibits solution in the milk. We have discovered that by adding a small amount of borax to the alginate compound the alginate particles will be thoroughly dispersed, i. e., separated and suspended, in the water, and that the rate of solution is inhibited by the addition of the borax, thus giving a solution of low viscosity. This mixture can be readily poured into the pasteurizer to give a thorough dispersion of the alginate in the milk. This dispersion favors the solubility of the alginate in the milk since the milk can act on each particle and dissolve it, whereas if lumps existed, many of the particles would not be contacted by the milk.

A specific example of our new product and method is as follows:

Enough alginic acid paste (as described in U. S. Patent #2,036,922) was placed in a dough mixer to give 100 pounds of alginic acid (anhydrous basis). This acid contained 800 pounds of water. Then 32 pounds of sodium carbonate powder was sifted into the mixer. 6 ounces of borax and 2 pounds of soda ash dissolved in 5 gallons of warm water was added to the above mix, and 25 pounds of tri-sodium phosphate ($Na_3PO_4:H_2O$) was also added. Then enough sugar and dextrine was added to give the final product the desired strength. The resulting paste was then dried, ground, sifted through a 40 mesh screen and packaged.

Another specific example of our new product and method is as follows: 1,000 pounds of alginic acid was prepared according to U. S. Patent #2,036,922, containing 900 pounds of water. This acid was mixed in a dough mixer with 25 pounds of sodium carbonate. To the resulting paste, 5 gallons of warm water containing 6 ounces of borax and 2 pounds of soda ash was added. Then 33 pounds of di-sodiumphosphate was also added, then enough sugar and dextrine to give the final product the desired colloidal strength. The resulting paste was then dried, ground and sifted through a 40 mesh screen.

When 10 pounds of this borated alginate compound was placed in 5 gallons of water, at 70° F. and the mixture stirred for half a minute, all the particles of the alginate compound were completely surrounded by water and were not lumped. The solution was then poured into a 500 gallon pasteurizing vat filled with an ice cream mix at 155° F. The ice cream mix was composed of—

| | Pounds |
|---|---|
| Condensed milk (20% serum solids) | 1600 |
| 3½% butter fat milk | 920 |
| Cream with 40% butter fat | 840 |
| Sugar | 600 |

After twenty minutes of pasteurizing the mix was passed through a homogenizer, cooled, and frozen into ice cream. No undissolved alginate particles were found in the pasteurizer, pipe lines, or screens.

There should be enough borax present in the alginated compound to permit about two minutes of stirring of the compound in cool water before pouring the solution into the pasteurizing vat. A shorter time is possible, but if the operator is interrupted while dispersing the alginates, or if water temperatures around 100° F. are used, the alginate is apt to lump in the bottom of the can. Longer dispersion times could be obtained, but are not necessary.

The following table shows the effect of the amount of borax used in an alginate compound to obtain maximum dispersion time in 70° F. water:

TABLE I

| Percent borax in alginate compound | Percent borax eventually added to ice cream mix | Maximum dispersion time in water in minutes |
|---|---|---|
| 0 | 0 | 1 |
| .12 | .0003 | 3 |
| .22 | .0006 | 3 |
| .33 | .0008 | 4½ |
| .44 | .0012 | 6 |
| .66 | .0018 | 6 |
| 1.37 | .0036 | 6 |

The maximum time represents the time before the solution becomes too thick to pour. Probably from .1% to .3% borax in the alginate compound is the most desirable range; as it is effective and only adds a small trace of borax to the milk products.

The relationship between the pH of the alginate compound and amount of borax is illustrated in the following table:

TABLE II

Effect of pH on samples of alginate containing a constant amount of borax

| pH | Maximum water dispersion time |
|---|---|
| | Minutes |
| 9.95 | 3 |
| 10.1 | 5½ |
| 10.35 | 8 |
| 10.55 | 12 |
| 10.8 | 23 |

Various amounts of tri-sodium phosphate added to the same borated alginate paste gave varying pH's. As the pH was increased, samples were taken and dried and ground. 10 gram samples were then dispersed in 40 cubic centimeters of water and the time of stirring (before the solutions were too thick to pour) was recorded. A product with a pH of 9.95 took three minutes, whereas when the pH was 10.8 the same product with the same amount of borax took twenty-three minutes to become too thick to pour.

The temperature of water used for dispersion also affects the time of stirring permitted before the borated composition becomes too thick to pour. This is illustrated in the following table:

TABLE III

| Water temperatures | Maximum dispersion time in minutes |
|---|---|
| 70° F | 3 |
| 80° F | 2½ |
| 90° F | 1¾ |

Samples containing 10 grams each of the same borated alginate were dissolved in beakers containing 40 grams of water at different temperatures. High temperatures naturally gave faster rates of solution, and at lower temperatures the rate was reduced. For practical purposes we prefer to use water from 50° to 80° F., which temperatures are readily obtainable in most cases. Temperatures around 160° F. would not be suitable unless an abnormal amount of borax was used. Colder water is entirely satisfactory.

The essential features of our invention are: (1) The use of borax to reduce the solubility rate of the alginate. (2) Use of cool water to disperse the alginate. (3) Use of a small amount of water to disperse the alginate so that the final ice cream mix or other stabilized milk product is not appreciably altered by water dilution. (4) Control of the solution rate of the compound by varying the pH of the alginate and amount of borax used.

Our method of obtaining a solution of alginate is particularly useful in the manufacture of ice creams, ice milk and chocolate milk. Also in obtaining a solution of alginates where little agitation is available during the dissolving of the alginate. Also to dissolving alginates in cream and other dairy products when pasteurizing vats are used. It would also apply in other arts using an alginate salt over 7.7 pH, such as in manufacture of textiles and paints.

The borax may be added at any stage of the process, either directly to the alginic acid, or to the paste before drying, or dry borax to the dried alginate product, and even to the water used to disperse the alginate. We prefer to add it to the paste as described above.

Our borated alginate compounds and method may also be used to dissolve in milk products, for example, a dry mix of alginates and phosphates, the borax retarding the solubility enough to make the phosphates more effective.

We claim:

1. A borated alginate composition.

2. A readily dispersible borated alginate composition; comprising a mixture of alginic acid and borax.

3. A readily dispersible borated alginate composition; comprising a mixture of alginic acid, soda ash, and borax.

4. A readily dispersible borated alginate composition comprising a mixture of alginic acid, soda ash, borax, and sodium phosphate.

5. A readily dispersible borated alginate composition; comprising a mixture of alginic acid, soda ash, borax, sodium phosphate, sugar and dextrine.

6. The method of rendering alginate compositions readily dispersible in a small amount of water; consisting in adding a small percent of borax to such compositions.

7. The method of alginating products; consisting in adding a small percentage of borax to an alginate to render the same readily dispersible in a small amount of water, and then adding a water dispersed mixture of such borated alginate to the product.

8. The method of alginating milk products; consisting in adding a small percentage of borax to an edible soluble alginate composition to render the same readily dispersible in a small amount of water, and adding a dispersed mixture of such borated alginate composition to milk products during pasteurization thereof.

9. The method of alginating an ice cream mix; consisting in mixing alginic acid, soda ash, and borax to form a borated alginate composition, forming same into a paste, drying the paste, reducing the dried paste to pulverulent form, mixing the pulverized borated alginate composition with water, and mixing the resultant water dispersed mixture with the ice cream mix during pasteurization thereof.

10. The method of alginating an ice cream mix, consisting in mixing alginic acid, borax, soda ash and tri-sodium phosphate to form a borated alginate composition, forming same into a paste, drying the paste and reducing it to pulverulent form, adding such pulverulent composition to water, and pouring the resultant water dispersed mixture into the ice cream mix during pasteurization thereof.

11. A readily dispersible alginate composition, comprising a mixture of approximately 100 pounds alginic acid, 800 pounds of water, 32 pounds of soda ash, and 6 ounces of borax.

12. A readily dispersible alginate composition, comprising a mixture of approximately 100 pounds alginic acid, 32 pounds of soda ash, 6 ounces of borax, and 25 pounds of tri-sodium phosphate.

13. The method of alginating an ice cream mix, consisting in mixing approximately 100 pounds alginic acid, 32 pounds of soda ash, 6 ounces of borax, and forming a dispersion of 10 pounds of said mixture in 5 gallons of water; and adding the solution to the ice cream mix during pasteurization thereof.

14. The method of alginating an ice cream mix, consisting in mixing approximately 100 pounds alginic acid and 32 pounds of sodium carbonate; 6 ounces of borax, 2 pounds soda ash, and 25 pounds of tri-sodium phosphate; forming a dispersion of 10 pounds of said mixture in 5 gallons of water, and adding the borated water dispersal mixture to the ice cream mix during pasteurization thereof.

15. The method of alginating an ice cream mix; consisting in mixing alginic acid, borax, soda ash, dextrine, sugar, and tri-sodium phosphate to form a borated alginate composition, forming such composition into a paste and drying it, and reducing the dried paste to pulverulent form; adding such pulverulent material to water, and pouring the resultant water dispersed mixture into the ice cream mix during pasteurization thereof.

16. The method of making a readily dispersible borated alginate composition, comprising the steps of mixing alginic acid, soda ash and borax with water to form a paste; drying the mixture; and then pulverizing same.

17. In a method as set forth in claim 16, adding sodium phosphate to the paste ingredients.

18. In a method as set forth in claim 16, adding sodium phosphate, sugar, and dextrine to the paste ingredients.

JEAN KINGSLEY MARTELL.
JOSEPH W. SCHALLER.